Patented Aug. 9, 1932

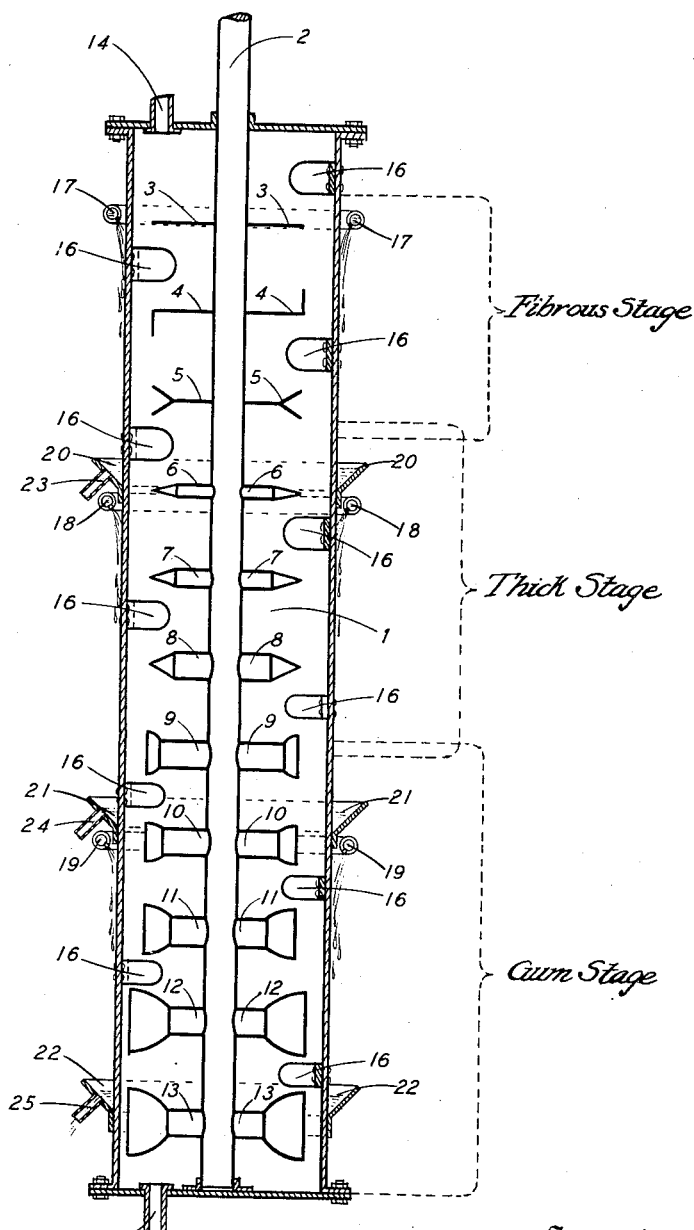

1,870,980

UNITED STATES PATENT OFFICE

JEAN ALTWEGG, OF LYON, FRANCE, ASSIGNOR, BY MESNE ASSIGNMENTS, TO E. I. DU PONT DE NEMOURS AND COMPANY, OF WILMINGTON, DELAWARE, A CORPORATION OF DELAWARE

METHOD OF MANUFACTURING CELLULOSE ACETATE

Application filed May 5, 1927, Serial No. 189,100, and in France May 10, 1926.

The technical processes most often used for the manufacture of cellulose acetate consist in causing acetic anhydride to react upon the cellulose fibre; which may be in the form of cotton, wood fibre, straws or any other, and, if desired, though not essential submitted to a preliminary treatment such as an alkaline or acid purification treatment, bleaching, or any hydrolizing treatment, or several such treatments, successively or simultaneously.

The operation is carried out, preferably, in the presence of a certain quantity of a catalizing agent, such as mineral acids, certain organic acids, metallic halogenated compounds, etc.

As diluting agent, a liquid, solvent of cellulose acetate, is added, such for instance as glacial acetic acid.

The whole of this acetylating liquor may be added at one time, or in several portions during the course of the operation. Moreover, the diluting agent may be added first, and the acetylating agents properly so called may be added afterwards.

The reaction is carried out at different temperatures, generally a low temperature is used at the beginning, the operation being brought to completion at a higher temperature.

During this operation, the reacting mass is energetically stirred.

The reaction, so conducted, presents the special problem that the consistency and the structure of the reacting mass continuously and deeply changes during the operation.

At the beginning of the operation the intact fibre, merely wetted, is being dealt with. Little by little, this fibre swells and forms an extremely tenacious magma. Later, the swelled fibre dissolves and the mass becomes more flowing, assuming towards the end of the operation, the form of a transparent, more or less fluid, gum.

A great technical difficulty must therefore be faced, namely, the selection of a stirring device which acts efficiently on the intact fibre as well as on the thick magma and the final, more or less fluid, gum. The apparatus, usually employed for this purpose, are generally very powerful kneading mixers which subject the material to an actual grinding.

These apparatus must be powerful; in fact, during the first stage, the intact fibre has a tendency to jam the arms of the mixer, and during the second stage, where all the mass is in the form of a thick magma, great mechanical effort must be exerted in order to perform the mixing.

During the whole of the last stage, during which the product of the reaction is more or less fluid, the mixer is not at all a suitable apparatus.

It has been ascertained by applicant that it is much more efficient to perform the acetylation in an apparatus provided with different stirring devices adapted to the consistency of the mass at each stage of the reaction and, according to the present invention, the mass is caused to pass through an apparatus provided with different kinds of mixing devices.

At the same time, in such an arrangement, a continuous progression of the acetylation is obtained, the fibre and acetylating liquor being introduced at one end, and the finished gum leaving the apparatus at the other end.

The mixing devices which are suitable for the first, or fibrous, stage are points, or arms bent at right angles constituting hook-like members presenting a small area, which catch and tear the fibre without kneading or squeezing it.

The mixing takes place in this manner with very little effort, without risk of jamming or seizing.

For the thick stage, strong mixers of simple form which act as kneaders, are used.

Finally, for the gum stage, the mixing is done by means of paddles or scull-shaped members.

The passage of the mass from one consistency to another not being sudden and forcible, but progressing by intermediate stages, similarly the transition from one mixing system to another may take place by intermediate systems.

As an example, one can give to the acetylating apparatus the form of a practically vertical tube, or of a column provided with a central shaft which carries stirring members, rotating horizontally. The cellulose fibre and the acetylating liquor are introduced at the top of the column, and the cellulose acetate gum is continually extracted at the lower portion.

The drawing accompanying and forming part of this specification illustrates in vertical central section, by way of example only, one form of apparatus which may be used for carrying the present invention into practice. In this form the apparatus comprises a vertical tube or cylinder 1, having a central shaft 2 mounted for horizontal rotation in said cylinder, the cylinder being provided in its cover with a tubular inlet 14 through which the cellulose fiber and acetylizing fluid may be charged, while a tubular outlet port 15 is provided in the bottom of the cylinder through which the cellulose acetate may be continuously drawn off. Secured to the shaft for rotation therewith are a plurality of agitating members 3, 4, 5, 6, 7, 8, 9, 10, 11, 12 and 13, said members being divided into several distinct groups, the individual members of each group varying in size and form from those of the remaining groups. For instance the group nearest the upper or intake end of the apparatus comprises a pair of comparatively slender arms 3. The next succeeding group comprises a pair of similar arms 4 bent preferably at right angles and preferably also in opposite directions, at their respective free ends. The third group comprises a pair of similarly slender arms 5, which are respectively forked at their free ends, it being understood that the invention is not limited to the exact formation at the ends of the arms of this or any of the other groups, since this may be varied as seems desirable. The fourth group comprises three pair 6, 7 and 8, of similarly formed members having pointed ends, the members of the succeeding pairs being progressively stouter. The fifth group again comprises three pair 9, 10 and 11 of similarly formed members, the ends of these members being in the form of paddles, the paddles of the last pair being larger than those of the preceding pair. The sixth and last group comprises two pair 12 and 13 of similarly formed paddle members, all of which are larger and longer than those of the preceding group.

It will be understood that any suitable means may be employed for rotating the shaft 2. Owing to the organization of agitating members above described, the reacting mass during its passage through the cylinder is stirred according to its structural changes. In other words, at every stage in the progress of the mass it encounters a form of stirring member which is best adapted for the structure of the mass at that particular stage. Moreover, at those points where the mass would tend to rotate with the shaft, for instance in the spaces between the stirring members, a series of stationary baffles or deflectors 16 is provided, these baffles being shown in the present instance extending inwardly from diametrically opposite sides of the cylinder, those at one side being in staggered relation to those at the opposite side.

The temperature of the mass as it passes through the cylinder may be easily regulated. This may be accomplished if desired by providing the cylinder with a water jacket or pipes disposed within the cylinder in which liquids at the desired temperature may be caused to circulate, or, as shown in the drawing, irrigation pipes 17, 18 and 19 may encircle the cylinder, from which pipes the liquids may be caused to flow over the outer surface of said cylinder, traps 20, 21 and 22 have discharge pipes 23, 24 and 25 being provided for catching and disposing of the liquids passing down from the pipes 17, 18 and 19 respectively. A well defined region of the cylinder or column can thus be cooled or heated at will, thereby obtaining a constant temperature for each phase of the reaction.

The cylinder may, if desired, be of different diameters at different parts thereof. For instance, at places where slow passage of the mass is desired the diameter of the cylinder may be comparatively large, while at places where rapid progress is desired the diameter may be reduced thereby to facilitate rapid heating or cooling. Moreover, the cylinder, instead of being a single structure as shown herein, may comprise a plurality of sections through which the mass may be caused to pass in succession.

It is believed that the operation of the apparatus will be obvious from the foregoing description. The cellulose fibre and the acetylating agents are fed into the cylinder at the top thereof. The simplest manner of feeding is to introduce the cellulose fibre and all of the acetylating agents at once. When special qualities are desired, however, pipes may be disposed so as to deliver parts of the acetylating agents to any desired zone in the length of the cylinder. In this way the effect of the familiar acetylation methods by which the acetic acid and the anhydrid are caused to act separately on the fibre, may be obtained.

The apparatus herein described permits the operation to be carried on under specific and exact temperatures and provides special stirring for each stage. In addition, it makes it possible to obtain accurately cellulose acetates possessing predetermined degrees of viscosity, clearness of solution, solubility etc. The size of the apparatus is reduced to the minimum, as the same is completely filled throughout the operation, so that there is no chance of any unused space to cause trouble, while the continuity of operation avoids loss of time in charging and discharging.

Having thus described my invention, what I claim is:

1. A method of preparing cellulose acetate which comprises treating a cellulose material with an acetylating agent and subjecting the reacting mass continuously and progressively to tearing, kneading and paddling operations.

2. A method of preparing cellulose acetate which comprises treating a cellulose material with an acetylating agent, initially subjecting the reacting mass to a tearing operation, kneading the reacting mass in the thick stage and paddling the reacting mass while in the gum stage.

In testimony whereof I have signed my name to this specification.

JEAN ALTWEGG.